United States Patent
Lesser (10) Patent No.: US 6,741,264 B1
(45) Date of Patent: May 25, 2004

(54) METHOD OF GENERATING AN AUDIBLE INDICATION OF DATA STORED IN A DATABASE

(75) Inventor: Michael F. Lesser, Melbourne Beach, FL (US)

(73) Assignee: GIFIC Corporation, Melbourne Beach, FL (US)

(*) Notice: Subject to any disclaimer, the term of this patent is extended or adjusted under 35 U.S.C. 154(b) by 0 days.

(21) Appl. No.: 09/309,576

(22) Filed: May 11, 1999

(51) Int. Cl.⁷ ................................................ G09G 5/00
(52) U.S. Cl. ....................................................... 345/727
(58) Field of Search ................................ 345/727, 729, 345/978, 728, 977, 968; 340/384.5; 600/514; 84/600

(56) References Cited

U.S. PATENT DOCUMENTS

| | | | |
|---|---|---|---|
| 3,624,632 A | | 11/1971 | Ophir |
| 4,754,762 A | * | 7/1988 | Stuchl .......................... 600/509 |
| 5,321,800 A | * | 6/1994 | Lesser ......................... 345/440 |
| 5,689,078 A | * | 11/1997 | McClard ........................ 84/600 |
| 5,715,412 A | * | 2/1998 | Aritsuka et al. ............. 345/729 |
| 5,730,140 A | * | 3/1998 | Fitch ........................... 600/514 |
| 5,907,116 A | * | 5/1999 | Hertha ........................ 84/600 |
| 6,184,876 B1 | * | 2/2001 | Miller ...................... 715/500.1 |
| 6,469,712 B1 | * | 10/2002 | Hilpert, Jr. et al. ......... 345/727 |

* cited by examiner

Primary Examiner—John Cabeca
Assistant Examiner—Blaine Basom
(74) Attorney, Agent, or Firm—James N. Dresser, Esq.; McGinn & Gibb, PLLC.

(57) ABSTRACT

A method of generating an audible indication of data stored in a database and representing a group of data points. Preselected audible sounds are assigned to indicate various degrees of variation in the values of the data for the respective data points from normal or expected values for such data. A visual display is created having an arrangement indicative of the data points providing the data in the database. The visual display is scanned, and for each scanned data point the preselected audible sound is generated which indicates the degree of variation in the value of the data from the normal value for such data. Display figure icons can be included in the visual display, corresponding to the data points, each icon indicating the degree of variation in the value of the data for the corresponding data point from the normal or expected value for such data, thus providing a visual indication of the value of the data for the data point presently being scanned, as well as an audible indication.

26 Claims, 7 Drawing Sheets

METHOD OF GENERATING AN AUDIBLE INDICATION OF DATA STORED IN A DATABASE

FIELD OF THE INVENTION

The present invention pertains to a method for graphical data comprehension, and, in particular, to a method of generating an audible sound, providing a ready indication of the value of data so as to permit an observer to rapidly evaluate information about a large amount of interrelated data.

BACKGROUND OF THE INVENTION

Many activities require the rapid assimilation of large amounts of data. Often, the data are related to physical systems. By way of example, in the field of medicine physicians are required to rapidly assimilate large amounts of data regarding the condition of a patient. Human patients have numerous physical systems that require monitoring, such as the respiratory system and the circulatory system. Numerous internal organs also require monitoring, for example the liver, the spleen and the pancreas. While monitoring the various systems and organs is frequently automated, for example by means of a heart monitor to monitor the heart rate, vast amounts of data are generated indicative of the condition of the various systems and organs. Assimilating this large amount of data can be time consuming for the physician who must make rapid decisions as to the condition of the various systems and possible treatment. Any one doctor is likely to be responsible for numerous patients, significantly increasing the data the doctor must assimilate.

Similarly, military operations often require rapid decisions as to the course of action to be taken, and such decisions require rapid assimilation of large quantities of data as to the amount and condition of military assets, not only those of the military unit taking the action, but also data as to the assets of the opposing military unit, the terrain, and the indigenous population.

The rapid assimilation of large amounts of data is required in numerous other domains, both physical and otherwise, for example, in the fields of business, finance and real estate.

My U.S. Pat. No. 5,321,800, the disclosure of which is incorporated herein by reference, concerns a GIFIC language method of generating a visual display for a database of information on a physical system. The display provides a plurality of display segments corresponding with data points of the physical system so that the visual display presents an image having a morphological arrangement approximating the physical system. Preselected display figure icons are displayed for each display segment to indicate the degrees of variation in the value of the data of the corresponding data point from a normal value for such data, and the data points are identifiable from the display locations of their respective icons and a metaphorical background. This may be either created indirectly by the appropriate placement of the icons, called KEGS in the GIFIC language, or directly by using an actual picture metaphor in modern implementations. Other display figure icons are displayed to indicate the state of two state or multi-state data. An observer is able to rapidly determine the value of the data for each data point as compared with a normal or expected value for such data, and to determine the state of two-state or multistate variable data. However, it is necessary for the observer to be closely watching the display in order to note any significant sudden change in the value of the data. Should the observer be otherwise occupied, a critical change in value might not be noted until significant time had passed.

SUMMARY OF INVENTION

A preferred embodiment of the present invention is a method of generating an audible indication of data in a database, the data representing a plurality of data points. Preselected audible sounds are assigned to indicate various degrees of variation in the values of the data for the respective data points from normal or expected values for such data. A visual display is created having an arrangement indicative of the data points providing the data in the database. The visual display is scanned, and for each scanned data point, the preselected audible sound is generated which indicates the degree of variation in the value of the data for the scanned data point from the normal or expected value for the data for such data point.

The audible sounds can be musical tones, and might be based on the musical circle of fifths. For example, for multi-valued data, a normal value for the data of a scanned data point can be indicated by a tone having a preselected pitch, such as middle C. Increasingly higher deviations of the data from the normal value can then be indicated by increasingly higher tones from the circle of fifths, and increasingly lower deviations can be indicated by increasingly lower tones from the circle of fifths. For binary or two state data, a high tone can indicate one of the two states, while a low tone can indicate the other state. Alternatively, to indicate that data is two state data, two tones from a different key or from a different musical instrument can be utilized.

In accordance with a second preferred embodiment of the present invention, the visual display indicative of the physical system includes icons indicative of the degree of variation in the value of the data for a corresponding data point from a normal or expected value for such data. The icons provide a visual indication of the variation in the values of the data from normal or expected values, and as the display is scanned, audible indications of the variation of values of the data are also obtained. Such a display can advantageously be provided using the GIFIC graphical language by assigning a specific musical tone from the circle of fifths and a specific GIFIC KEGS to represent each degree of variation from a normal value.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

Each of FIGS. 3A–3C is a fragmentary depiction of a display screen and illustrates one of the various scanning techniques usable in the method of the present invention.

Each of FIG. 5A–5G depicts a display figure icon which can be used in the method of the present invention to provide a visual indication of data, in addition to an audible indication.

DETAILED DESCRIPTION OF PREFERRED EMBODIMENTS

Figure 1:
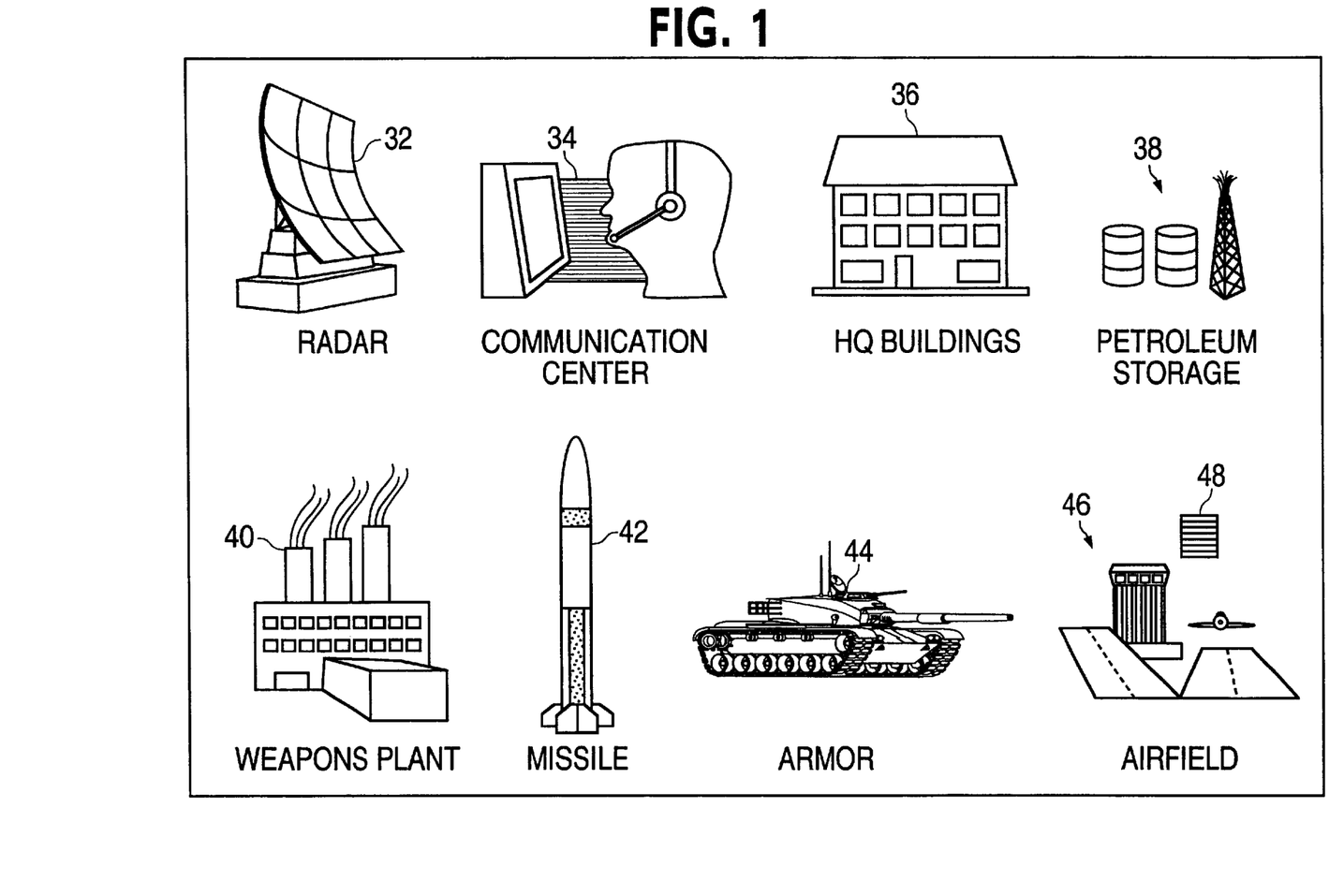
FIG. 1 depicts a display of various components of a physical system in an example of the present invention.

FIG. 1 presents an illustrative display made up of eight display figures indicative of various exemplary physical components or assets of a military operation. Each component may represent an asset of one side in a military conflict, for example. Thus, display component 32 illustrates a radar site, while display component 34 represents a communication center. Headquarters or other buildings of the military system are depicted by component 36. Component 38 represents a petroleum storage area. In like manner, display component 40 represents a weapons plant, while component 42 represents a missile site. Armor is indicated by a component 44, while an airfield is indicated by a component 46. In a military conflict, a similar display can be provided for the assets of each side to the conflict, if desired.

Figure 2:
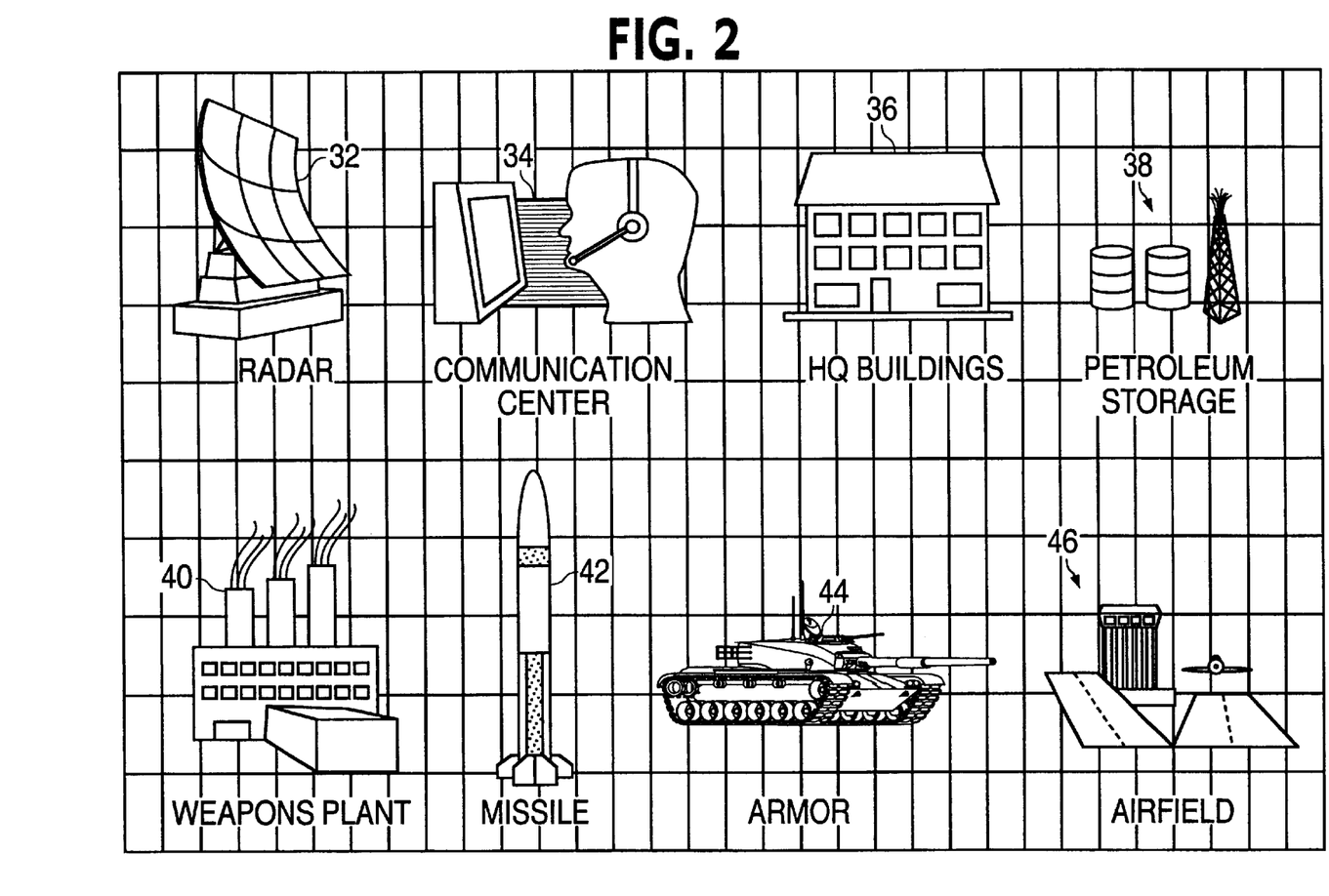
FIG. 2 depicts the visual display of FIG. 1 overlaid by a grid pattern and is useful in explaining various scanning techniques usable in the present invention.

FIG. 2 depicts the display of FIG. 1 overlaid by a grid pattern to illustrate the scanning of the display in order to indicate the status of the various parameters of each component within the display. In the illustrative example of FIG. 2, the display is overlaid by a grid pattern having ten display rows and 32 display columns, resulting in 320 display areas. Thus, in this example each of the eight components 32–46 is depicted in an associated 8 column by 5 row display section. The 320 display areas are scanned in sequence, and an audible indication of a parameter can be provided for each display area as it is scanned.

Figure 3A:
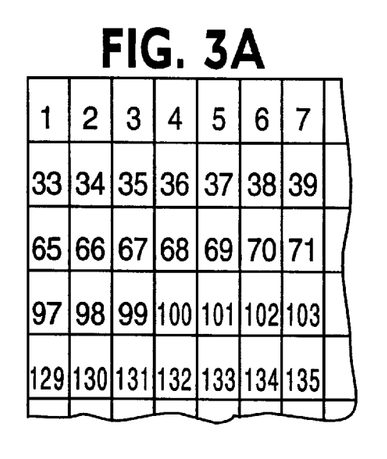

FIG. 3A illustrates a scanning sequence for a horizontal raster scan of the display of FIG. 2. Thus, the scan starts in the display area 1 in the upper left corner and proceeds horizontally across the topmost row through display areas 2–32. When all 32 display areas of the topmost display row have been scanned, the raster scan moves vertically downward to the next display row and returns to the leftmost column and scans horizontally across that display row through display areas 33–64. This sequence is repeated until each display row of the display has been scanned. Then the scan returns to the upper left corner and repeats.

Figure 3B:
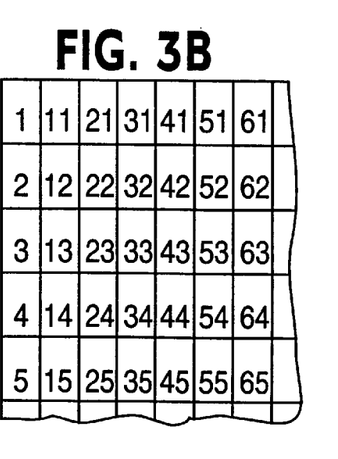

FIG. 3B illustrates a scanning sequence for a vertical raster scan which commences in the display area 1 in the upper left corner of the display screen and proceeds downwardly through the leftmost display column through display areas 2–10, then moves horizontally to the right one display column and returns to the topmost display row. That display column is then scanned vertically downwardly through display areas 11–20, and the process is repeated until each display column of the display has been scanned. The scanning sequence then returns to the top left and repeats.

Figure 3C:
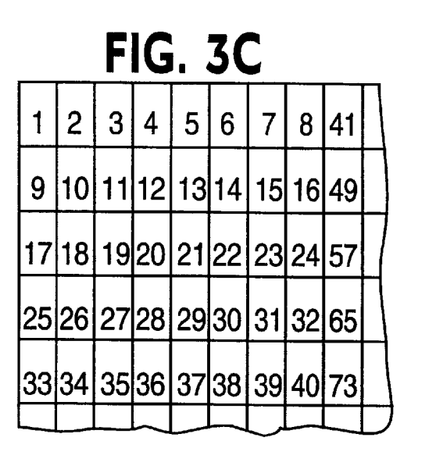

FIG. 3C illustrates a scanning sequence for a subraster scan in which each of the 8 column by 5 row display sections of FIG. 1 is scanned in sequence in a subraster scan which might be either horizontal or vertical. Thus, first the display section of radar site 32 may be scanned with a subraster scan, then the display section of communication center 34, followed by those of headquarters or buildings 36, petroleum storage area 38, weapons plant 40, missile site 42, armor 44 and airfield 46, in turn. Alternatively, first the display section of radar site 32 may be scanned, then that of weapons plant 40, followed by those of communication center 34, missile site 42, armor 44, headquarters building 36, petroleum storage area 38, and airfield 46. Each display section can be scanned either vertically or horizontally. Any other scanning sequence could, of course, be followed, as desired.

As the representation of each component is scanned on the display, an audible indication of the value of data regarding the corresponding component is provided. The same types of data can be monitored for each component of the system, or different data can be monitored for each, depending upon the particular component. As an example with reference to the military application depicted in FIGS. 1 and 2, an audible sequence of six sounds, such as musical notes, can be provided for each physical component, the six sounds indicating (1) the location of the component as indicated by a map of the area (2) the significance of the particular component, which might be based on the priority that the component has for destruction, (3) whether the component has previously been attacked, (4) the level of damage previously inflicted on the component, (5) whether an attack on the component is desired, and (6) whether an attack on the component has been scheduled. Some of the data points are binary in nature, for example, whether the component has previously been attacked, whether an attack is desired, and whether an attack has been scheduled. The two states of such two state data might be indicated, for example, by a high pitched sound and a low pitched sound, as appropriate. Others of the data points have a variable value, for example, the relative location of the component, the significance of the component, and the level of damage previously inflicted on the component. For such data points, an "expected" value of the data is more likely then a "normal" value, which would be more common in some other applications. These variable values might be indicated by different sounds and, for example, might be presented as nine musical notes based on the musical circle of fifths.

Figure 4:
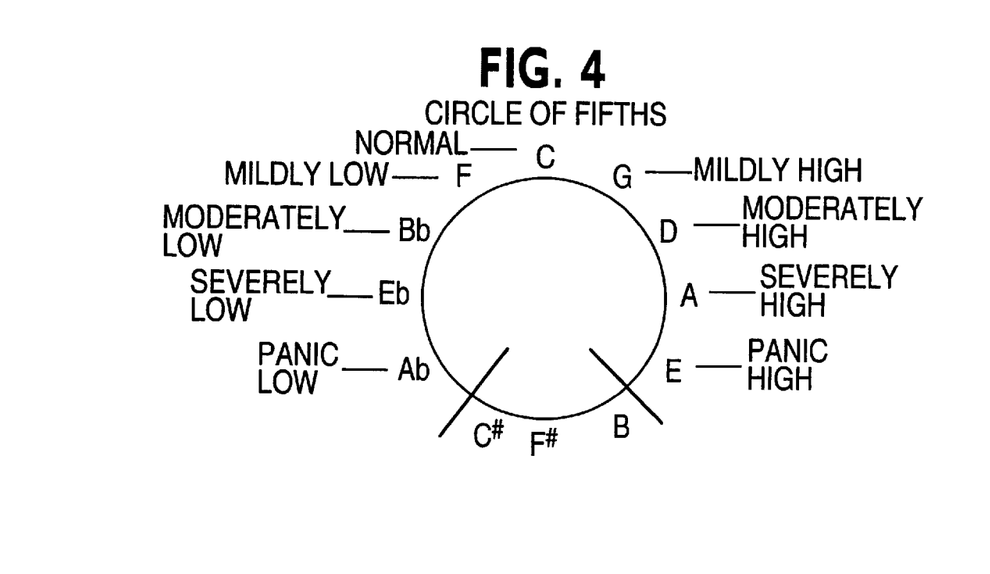
FIG. 4 is a diagram of the musical circle of fifths and is useful in explaining embodiments of the invention.

FIG. 4 illustrates the circle of fifths and relates it to musical notes that might be utilized in accordance with a preferred embodiment of the present invention. The musical note C designates a normal or expected value for the data from a data point. This can be middle C on the musical scale, if desired. Going clockwise on the circle of fifths to notes of higher pitch, G represents a value that is mildly high, while D represents a moderately high value, A a severely high value, and E a panic high value. Descending counterclockwise from C to notes of lower pitch, F designates a mildly low value, B♭, a moderately low value, E♭ represents a severely low value and A♭ a panic low value. For values for data points having binary data, a positive value or presence of the data can be represented by a high note such as A, and a negative value of absence of the data by a low note such as A♭.

Referring then to the airfield depicted in the display of physical components of a military situation, as depicted in FIG. 1, the sequence of six musical notes related to that airfield might be, for example, G, A, E♭, E♭, A, and A♭, indicating respectively that the airfield is in a particular area on a map, that the radar site has a very high significance, and thus a severely high or very high priority for destruction, that the airfield had not been attacked previously, that there had been no damage previously inflicted on the airfield, that an attack on the airfield is desired, and that an attack on the airfield has not yet been scheduled.

The timing or rhythm of the audible indications or musical notes can be selected to meet the observer's desires. Thus, for example, each audible indication might have a duration of one-tenth second, with a one-tenth second pause between audible indications. Any other timing could, of course, be utilized, so long as the separate segments are distinguishable by a listener. If desired, the duration of the notes can be variable and, for example, might indicate the significance of the data point or the reliability of the data. Likewise, the amplitude or volume of each audible indication can be controlled to indicate the age of the data, for example, with older data being played at a lower volume than more recent data. Alternatively, the volume can indicate the reliability or confidence level of the data.

As another example, with reference to the airfield depicted in FIG. 1, the six musical notes might represent the condition of six different assets at the airfield, such as a runway, a control tower, an aircraft refueling area, airplanes on the ground outdoors, a hanger, and a barracks. Musical notes might be utilized to indicate the conditions of these assets, ranging from severely damaged, to moderately damaged, to mildly damaged, to no damage, thus requiring only four notes.

A raster scan display on a cathode ray tube display screen is generally made up of a large number of scan lines, so that the display includes a plurality of display rows, each of which includes a plurality of scan lines. U.S. Pat. No. 3,624,632, the disclosure of which is incorporated herein by reference, discloses such a raster scan technique. If desired, the display of FIGS. 1 and 2 can be scanned in such a manner, at a scanning speed of 6.4 seconds per scan line so that each of the 32 display areas of each display row is scanned for two-tenths second, to permit a one-tenth second sound segment to indicate the value of any data point associated with the display area, and a one-tenth second interval between consecutive sound segments. Each display area may be scanned one time during each raster scan cycle. Alternatively, the display area of each data point may be scanned during each of a plurality of consecutive scan lines, with the result that the audible indications associated with the data point of the physical components each display row are sounded several times before the audible indications for the next display row are sounded.

If only one scan line is utilized for each display row, then in the horizontal raster scan technique of FIG. 3A, after one scan line of each display row has been scanned, the scan jumps to a scan line of the next display row. Similarly, if the vertical raster scan of FIG. 3B is being used, after one scan line of each display column has been scanned, the scan jumps to a scan line of the next display column. If the subraster scan of FIG. 3C is being used, after one scan line of each display row in a display section has been scanned, the scan jumps to the next display section, either horizontally or vertically, as desired. Each of these techniques will result in the audible indications associated with the data points of each physical component being sounded once during each scan cycle.

Regardless of the scanning technique used, preferably the scanning position is shown by a visual indicator, such as cursor 48 shown in FIG. 1, which moves across the display in synchronism with the scanning to provide a visual indication of the display area presently being scanned. The cursor can be any clearly visible shape and color. Alternatively, the intensity of the scanned segment might be increased while the segment is being scanned, thus providing a visual indication of the scan location without specific need for a defined cursor.

Figure 5A:
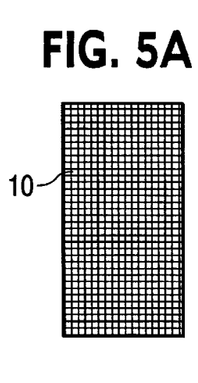
Figure 5B:
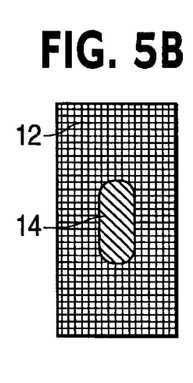
Figure 5C:
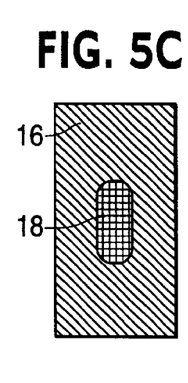
Figure 5D:
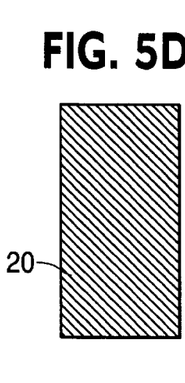
Figure 5E:
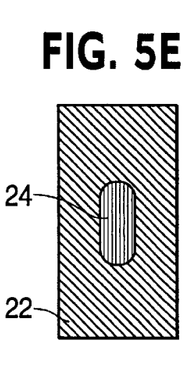
Figure 5F:
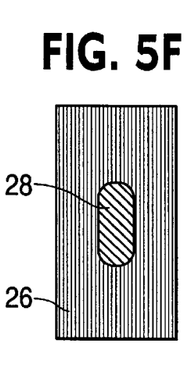
Figure 5G:
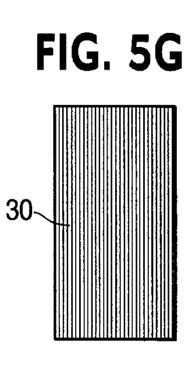

Each of FIGS. 5A–5G depicts an illustrative icon that can be used to provide a visual indication of data about a physical system. My U.S. Pat. No. 5,321,800 describes a system for providing such a visual indication. Briefly, an icon is displayed for each data point of the physical system, and the coloring of the icon indicates the variation in the value of the data for such data point from a normal or expected value for that data. Icon 10, depicted in the illustrative example of FIG. 5A, may be a yellow icon to indicate a severely low value for data. Icon 12 of FIG. 5B may be yellow with a green center 14 to indicate a moderately low value, while icon 16 depicted on FIG. 5C may be green with a yellow center 18 to indicate a mildly low value. A normal or expected value for data may be depicted by green icon 20 illustrated in 5D. FIG. 5E depicts an icon 22 which may be green with a red center 24 to indicate a mildly high value, while FIG. 5F depicts an icon 26 which may be red with a green center 28 to indicate a moderately high value. Icon 30 in FIG. 5G may be red to indicate a severely high value for data. Blinking of a yellow icon 10 can be utilized to indicate a panic low value for data, while blinking of a red icon 30 can be utilized to indicate a panic high value for data. Presence of two-state data might be indicated by a white icon, and absence of such data indicated by a black icon or by absence of an icon, as desired. Multi-state data might be indicated by a white icon for one state, a white hashed with red for another state, and a blue or brown icon for a third or even a fourth state.

Figure 6:
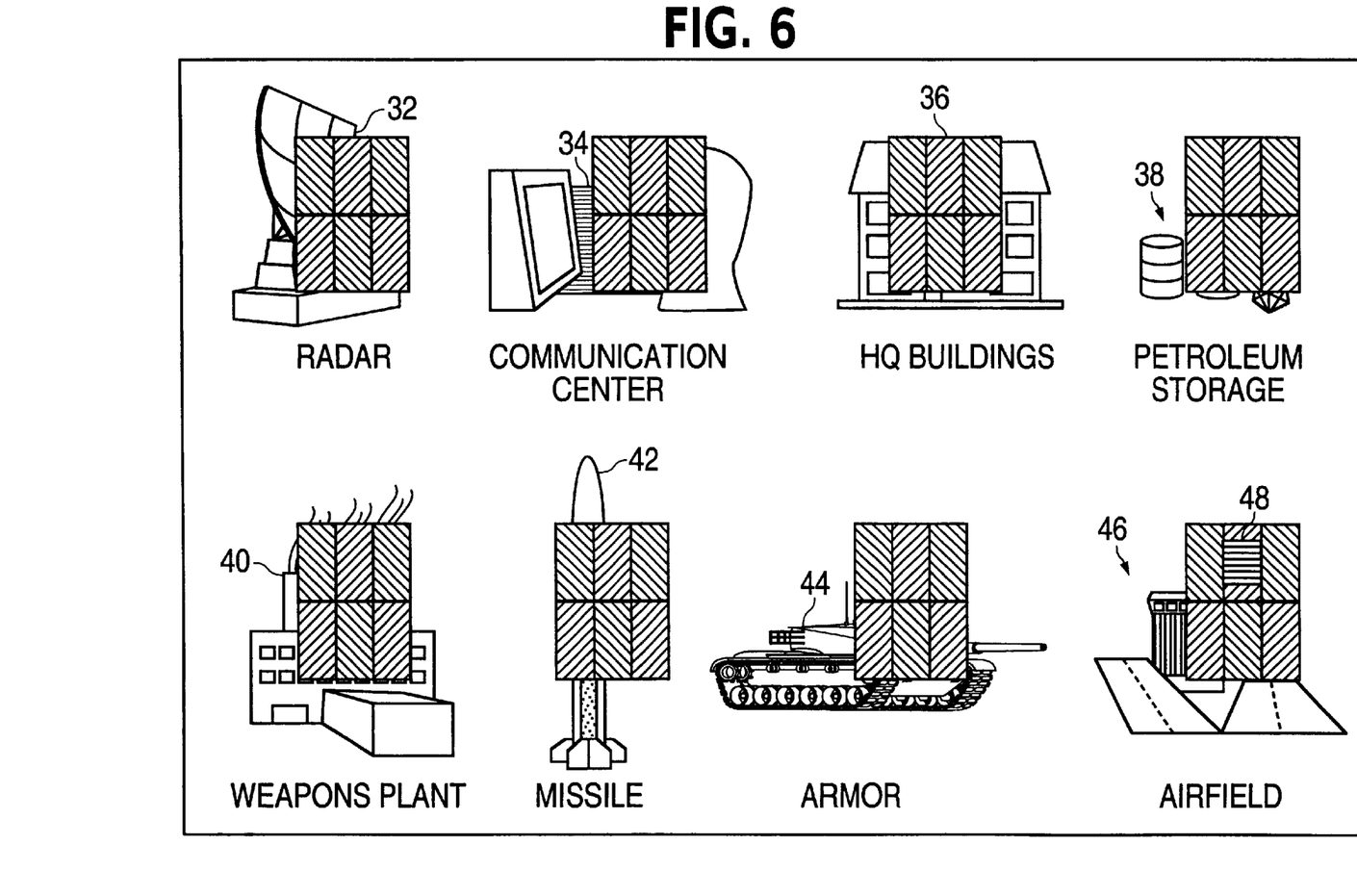
FIG. 6, depicts an illustrative display usable in providing both a visual indication and an audible indication of data about the physical systems illustrated in FIG. 1.

FIG. 6 depicts the military display of FIG. 1 with icons of the type shown in FIGS. 5A–5G superimposed on various of the display components to indicate the condition or status of the data points of that component. While FIG. 6 indicates only two colors or icons, such as green and brown, this is for ease of illustration only, and icons of the type depicted in FIGS. 5A–5G are preferred. A viewer can thus readily determine the status of each data point, and the status is also indicated by the audible sounds generated while the component is being scanned. Thus, both a visual and an audible indication of the data is provided. If a person concerned about the military situation monitored on the display of FIG. 6 is not watching the display when a component becomes critical, the audible indication will nevertheless alert the person that a critical situation exists.

Figure 7:
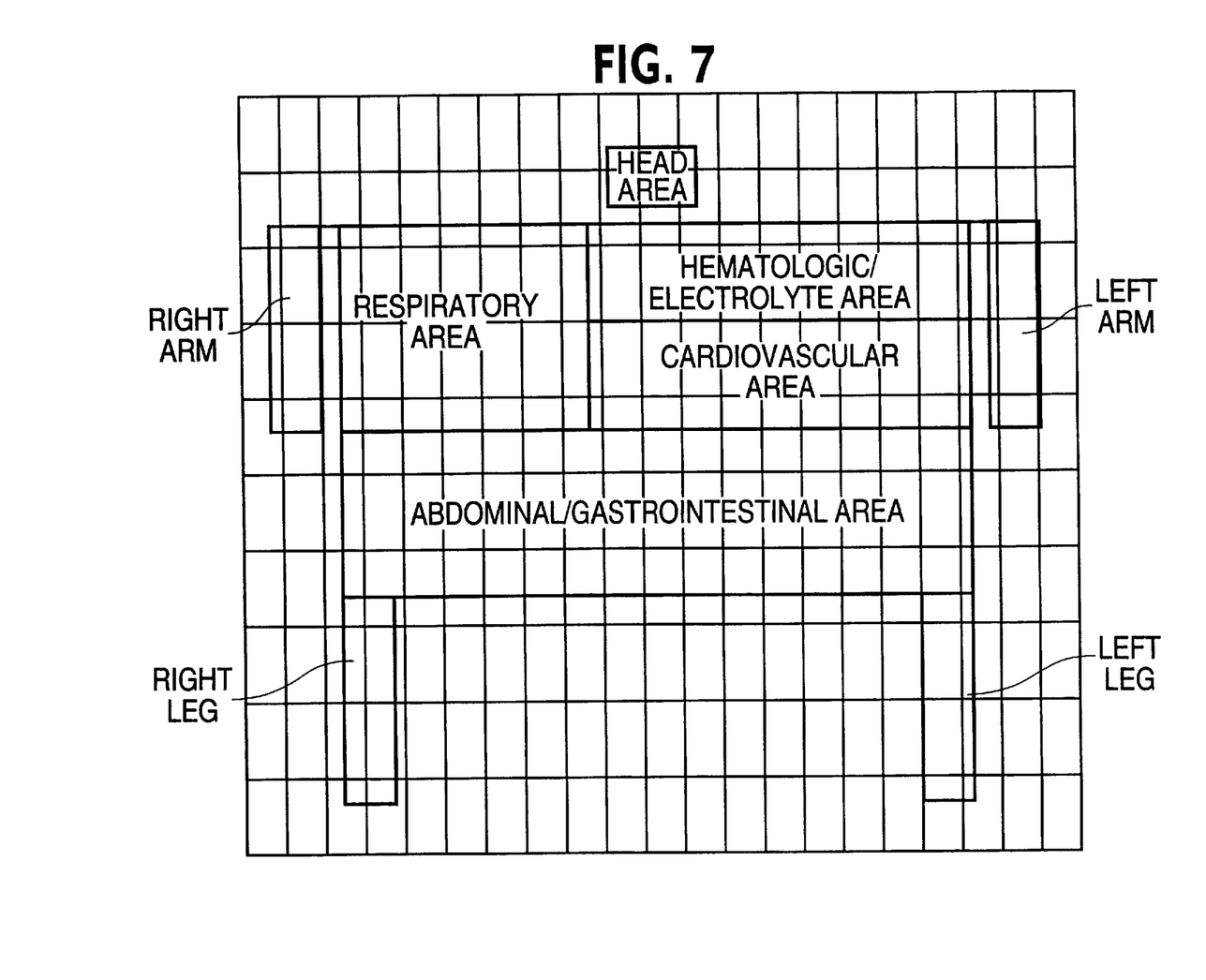
FIG. 7 depicts a visual display of another physical system overlaid by a grid pattern to illustrate scanning.

FIG. 7 illustrates a display of a morphological representation of a medical patient, as illustrated in my U.S. Pat. No. 5,321,800. Instead of, or in addition to, providing visual indications of the status of various systems within the patient, as disclosed in that patent, the display can be scanned to provide an audible indication in accordance with the present invention. In such an application, many of the data points having a "normal" value, while some may have an "expected" value. The present invention is likewise applicable to displays of information about numerous other types of systems, both physical and otherwise.

Figure 8:
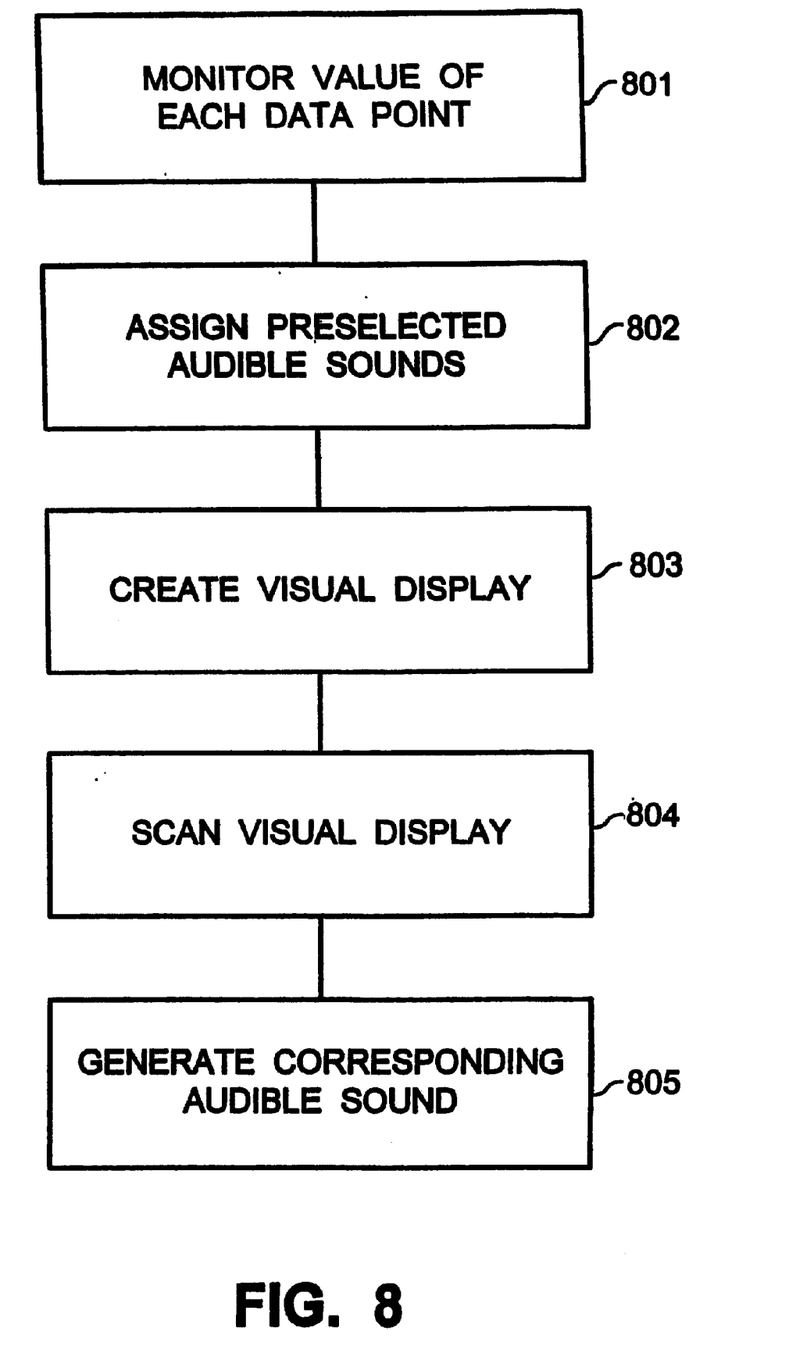
FIG. 8 is a flow chart of an illustrative method in accordance with the present invention.

FIG. 8 is a flow chart of steps on an illustrative method of generating an audible indication of data about a system in accordance with the present invention. The method comprises the steps of: monitoring the value of each data point in the system to create a database of data about the system, step 801; assigning preselected audible sounds to correspond with the degree of variation in the values of the data for the respective data points from normal or expected values for such data, step 802; creating a visual display indicative of the system, step 803; scanning the visual display, step 804; and for each scanned data point, generating the preselected audible sound indicating the degree of variation in the value of the data from the scanned data point from the normal value for the data for the scanned data point, step 805.

It is thus seen that the present invention provides an audible indication of the variation in values of data in a database by generating preselected audible tone corresponding with the degree of variation in the values of the data from the normal values for the data. Although the present invention has been described with reference to preferred embodiments, alternations variations and substitutions can be incorporated, and still the result will be within the scope of the invention.

I claim:

1. A method of generating an audible indication of data in a database, the data representing a plurality of data points, said method comprising the steps of:

(a) assigning preselected audible sounds to indicate various degrees of variation in the values of the data for the respective data points from normal or expected values for such data;

(b) creating a visual display having an arrangement indicative of the data points providing the data in the database;

(c) scanning the visual display;

(d) for each scanned data point, generating the preselected audible sound indicating the degree of variation in the value of the data for the scanned data point from the normal value for the data for the scanned data point.

2. A method as claimed in claim 1, wherein the audible sounds are musical tones.

3. A method as claimed in claim 2, wherein normal or expected data values are represented by a musical tone of a first pitch, data values greater than the normal or expected value are indicated by musical tones of a pitch higher than the first pitch, and data values less than the normal or expected value are indicated by musical tones of a pitch lower than the first pitch.

4. A method as claimed in claim 2, further comprising assigning preselected musical instrument tones to indicate various types of data points.

5. A method as claimed in claim 1, further comprising assigning further sounds to indicate the states of multi-state data.

6. A method as claimed in claim 1, wherein the display includes a plurality of display figure icons corresponding to the plurality of data points, each icon indicating the degree of variation in the value of the data for the corresponding data point from the normal or expected value for the data for such data point.

7. A method as claimed in claim 1, wherein in step (d) a segment of no sound is provided between segments of audible sound indicative of sequentially scanned data points.

8. A method as claimed in claim 7, wherein the segments of audible sound have fixed durations.

9. A method as claimed in claim 7, wherein the duration of the segments of audible sound is adjustable.

10. A method as claimed in claim 1, wherein step (c) comprises scanning the display with a raster scan.

11. A method as claimed in claim 1, wherein step (c) comprises scanning the display with a sub-raster scan.

12. A method as claimed in claim 1, wherein step (c) includes moving a visual indicator across the visual display in synchronism with the scanning.

13. A method of generating an audible indication of data about a system, the system having a plurality of data points, the indication including a plurality of segments corresponding with the respective data points, the segments being in a fixed sequence corresponding with the sequence of the data points, said method comprising the steps of:

(a) monitoring the value of each data point in the system to create a database of data about the system;

(b) assigning preselected audible sounds to correspond with the degree of variation in the values of the data for the respective data points from normal or expected values for such data;

(c) creating a visual display indicative of the system;

(d) scanning the visual display;

(e) for each scanned segment, generating the preselected audible sound indicating the degree of variation in the value of the data for the corresponding data point from the normal or expected value for the data for such data point.

14. A method as claimed in claim 13, wherein the system is a physical system, and step (c) comprises creating a visual display having a morphological arrangement approximating the physical system.

15. The method of claim 14, wherein the physical system includes a plurality of physical components.

16. A method as claimed in claim 13, wherein the audible sounds are musical tones.

17. A method as claimed in claim 16, wherein normal or expected data values are represented by a musical tone of a first pitch, data values greater than the normal or expected value are indicated by musical tones of a pitch higher than the first pitch, and data values less than the normal or expected value are indicated by musical tones of a pitch lower than the first pitch.

18. A method as claimed in claim 16, further comprising assigning preselected musical instrument tones to indicate various types of data points.

19. A method as claimed in claim 13, further comprising assigning further sounds to indicate the states of multi-state data.

20. A method as claimed in claim 13, wherein the display includes a plurality of display figure icons corresponding to the plurality of data points, each icon indicating the degree of variation in the value of the data for the corresponding data point from the normal or expected value for the data for such data point.

21. A method as claimed in claim 13, wherein in step (d) a segment of no sound is provided between segments of audible sound indicative of sequentially scanned data points.

22. A method as claimed in claim 13, wherein the segments of audible sound have fixed durations.

23. A method as claimed in claim 13, wherein the duration of the segments of audible sound is adjustable.

24. A method as claimed in claim 13, wherein step (c) comprises scanning the display with a raster scan.

25. A method as claimed in claim 13, wherein step (c) comprises scanning the display with a sub-raster scan.

26. A method as claimed in claim 13, wherein step (d) includes moving a visual indicator across the visual display in synchronism with the scanning.

* * * * *